July 2, 1968  L. R. MESSERA  3,391,260
IGNITION-LOCK SIGNAL MEANS
Filed June 7, 1967
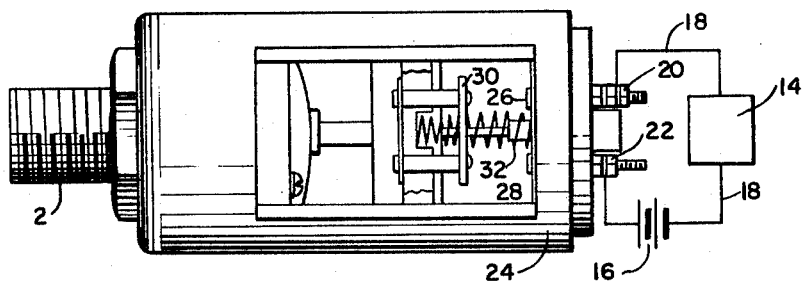
FIG.1.
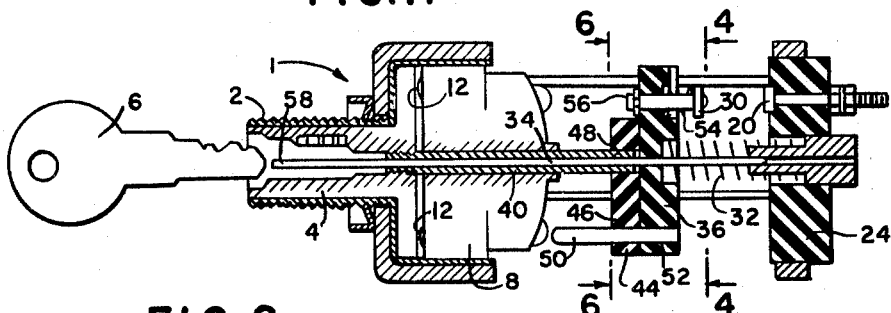
FIG.2.
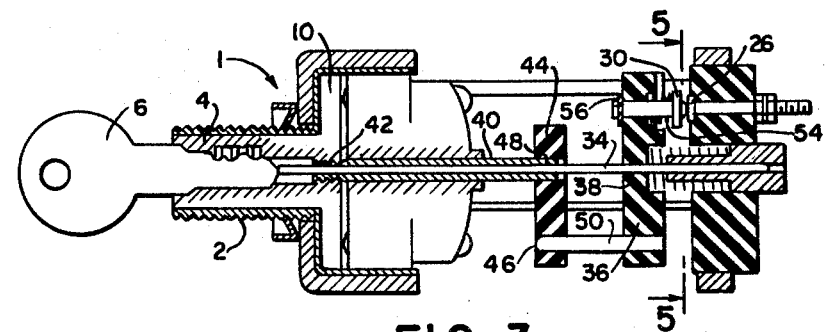
FIG.3.
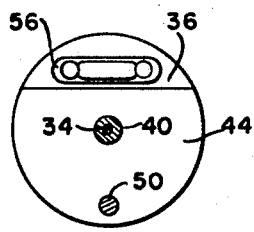
FIG.6.
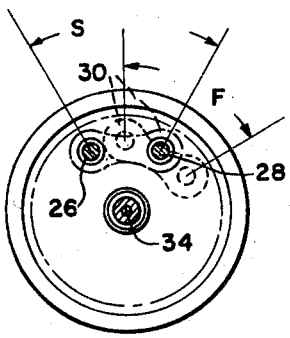
FIG.5.
FIG.4.
INVENTOR
Louis Ralph Messera
BY Clive H. Bramson
ATTORNEY

United States Patent Office 3,391,260
Patented July 2, 1968

3,391,260
IGNITION-LOCK SIGNAL MEANS
Louis Ralph Messera, 28 Spring St.,
Oyster Bay, N.Y. 11771
Filed June 7, 1967, Ser. No. 644,244
7 Claims. (Cl. 200—44)

ABSTRACT OF THE DISCLOSURE

A key-actuated ignition lock having a sleeve member connected to the barrel of the lock and rotatable with the barrel, a rod slidable in said sleeve member and one end of said rod being slidable into and out of said barrel, a pair of spaced contact points disposed adjacently of the other end of said rod, an electrically conductive bridge connected to said rod adjacently of the other end thereof, said conductive bridge being movable between bridging and non-bridging positions with respect to said contact points, the movement of said conductive bridge being responsive to movement of said barrel and rod, whereby a circuit including an electrical energy source and signal means in circuit with said contact points will be opened or closed in response to the movement of the key within said ignition lock.

---

The present invention relates generally to protective signal devices for use in vehicles such as automobiles and the like and more particularly to an ignition-key actuated signal adapted to warn the driver that he is about to leave the vehicle without removing the key from the ignition lock.

Unfortunately, automobile operators are known to frequently leave their cars without first removing the key from the ignition lock, this being done although the engine has been stopped, the windows have been closed, and all other preparations had been made prior to leaving the car. Such failure to remove the key from the ignition lock is often due to inadvertence, negligence, and at times simply due to the fact that the driver contemplates returning to his car within a short time and considers it convenient to have the key in the ignition upon his return thereto. Notwithstanding the invitation to theft, the obvious danger to children who are attracted to an automobile which has a key in its ignition, and the specific illegality in some jurisdictions of such an act, vehicle operators nevertheless persist in omitting to remove the ignition key prior to leaving the vehicle.

Accordingly therefore, the present invention is essentially directed to means which would cause the automobile operator an inconvenience were he not to remove the key from the ignition lock and to further provide an audible signal which would continue until the key had actually been removed from the ignition. Thus the operator would be aware that the car battery is being discharged as long as the signal is actuated and in the event the operator was merely forgetful, such a signal would serve as a reminder that the key still remains in the ignition.

Accordingly, an object of the instant invention resides in the provision of an ignition lock capable of actuating and deactuating an alarm signal, such as a buzzer, light, etc., by the rotation and withdrawal, respectively, of the key.

Another object of the present invention is to provide a device in accordance with the foregoing which utilizes the ignition key in carrying out an electrical switching operation, but which does so without interfering with or depending upon the tumblers of the ignition lock.

A further object of the invention resides in the provision of a novel switching action afforded by the movement of a rod member into and out of the barrel of the lock.

A further object of the invention resides in the provision of a novel switching action afforded by the movement of a rod member into and out of the barrel of the lock.

A still further object of this invention is to provide an electrical switching device which can be readily adapted to conventional vehicle ignition locks for compliance with the motor vehicle laws of various jurisdictions.

Another general object of the present invention is to provide a device of the described character which will be simple in structure, economical of manufacture and highly effective in use.

Other objects and advantages of the instant ignition-lock signal means will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

FIGURE 1 is a side elevational view of the ignition-key lock and signal switching means in circuit with a buzzer alarm and a power supply;

FIGURE 2 is a cross-sectional elevational view of the present device illustrating the key in a position removed from the barrel;

FIGURE 3 is a cross-sectional view of the device illustrating the key fully inserted into the barrel;

FIGURE 4 is a view taken along line 4—4 of FIGURE 2;

FIGURE 5 is a view taken along line 5—5 of FIGURE 3 and also showing in broken line the relative positions of the conductive bridge means; and FIGURE 6 is a view taken along line 6—6 of FIGURE 2.

Referring now in detail to the present preferred embodiment of the invention illustrated in the accompanying drawings, numeral 1 generally designates a conventional ignition-lock including a cylinder 2 and a key-actuated barrel 4 which is rotatable in the cylinder from a locked first position indicated as F in FIGURE 5 to an unlocked second position indicated as S in said FIGURE 5. The lock 1 is of the type commonly used in ignition systems of automobiles and similar vehicles, being of the type wherein the key 6 may be slid in and out of the barrel when the barrel is in the first position S, but wherein the key cannot be withdrawn from the barrel when the latter is in the second or locked position F, such as while driving.

Stationary switch member 8 coacts with rotary portion 10 which is integral with barrel 4 to either complete or deenergize the ignition circuit in response to rotation of the key within the barrel, contacts 12 of said member 8 being connected or disconnected depending upon the position of the key. Inasmuch as the ignition controlling function of the lock is conventional, further discussion concerning the structure of member 8 will be omitted herefrom.

As shown in FIGURE 1, buzzer or bell means 14 and electrical power source 16 are connected by wire 18 to terminals 20 and 22, the latter being spaced and insulated with respect to one another. Extending through dielectric terminal support 24, said terminals each include a contact point 26 and 28, respectively, exposed surfacedly of terminal support 24 as shown in FIGURES 2, 3, and 5 of the drawings. Electrically conductive bridge 30, when positioned across both said contact points 26 and 28 as shown in the first position S in FIGURE 5, serves to complete the buzzer circuit, thus effectuating actuation of the audible signal. Conversely when said pair of contacts 26 and 28 are moved to position F also illustrated in FIGURE 5, the buzzer circuit is broken and the signal stops.

With further reference to FIGURE 5, it will be understood that when said conductive bridge 30 is in position S the ignition is "OFF" and when in position F the ignition is "ON." Thus, it will be further understood that the conductive bridge as observed in FIGURE 3 is in position S, whereupon the signal will be actuated. In FIGURE 2, however, although the angular position of said conductive bridge is still that of position S, said conductive bridge has been moved laterally away from said contact points 26 and 28, thereupon creating an opening in the signal circuit and a curtailment of said signal. It will be noted that such lateral movement of said conductive bridge is a result of key 6 being removed from the barrel 4, coil spring 32 thereupon acting to urge rod 34 and bridge carrying means 36 which is connected to said rod at 38, toward said barrel 4. As further shown in FIGURE 3, insertion of key 6 into barrel 4 causes movement of rod 34 and bridge carrying means 36 toward terminal support 24 thereby placing bridge 30 in contact with contact points 26 and 28, such contact being broken when the key is turned to the second position also referred to herein as position F.

To the end of establishing the rotational capability of bridge carrying means 36 while still maintaining the lateral mobility thereof, sleeve member 40 is provided, said sleeve member being preferably tubular and threadedly connected at end 42 to barrel 4. Other suitable methods of accomplishing said connection can, of course be utilized. A plate member 44 provided with an aperture 46 as shown, is connected to said sleeve member 40 at end 48 thereof, said barrel 4, sleeve member 40 and apertured plate member 44 being therefore rotatable as a single unit.

Coupling means 50 which is essentially a pin integrally connected to bridge carrying means 36 at 52, projects normally from said bridge carrying means and is slidable within aperture 46 between the positions shown in FIGURES 2 and 3. Thus, when plate member 44 is rotated in response to the rotation of key 6 and barrel 4, bridge carrying means 36 will similarly rotate as aforedescribed, lateral movement of said bridge carrying means being permitted notwithstanding the stationary (with respect to lateral or longitudinal movement) nature of plate 36.

Conductive bridge 30, as shown, is resiliently mounted upon said bridge carrying means, coil spring 54 establishing such resiliency. Thus, firm contact between said conductive bridge and contact points will be achieved notwithstanding wear of either of the latter. Fastening clip 56 is provided to secure said conductive bridge to said bridge carrying means.

Thus, the instant invention when installed as the automobile ignition lock will serve as a positive deterrent against one's leaving the key in the ignition once the engine is turned off. In operation, the driver will insert the key into cylinder 2 and rotate the key to the ignition "ON" position. The signal will sound momentarily and then stop. The key will be locked in the ignition and the conductive bridge will be in position F. Upon turning the ignition "OFF," said conductive bridge will assume position S whereupon the signal will sound and continue to sound until the key is removed. Once the key is removed, end 58 of rod 34 will be urged into the barrel as shown in FIGURE 2 of the drawings and the bridge across contact points 26 and 28 will be removed; the sound signal being stopped.

It will be appreciated that any other electrically actuated signal means such as a light, etc., may be utilized in lieu of the buzzer, it being apparent, however, that the buzzer embodiment will be the most effective.

While the foregoing description is a preferred embodiment of the invention, it will be understood that it is not to be limited to the details shown, but is capable of modification and variation within the spirit of the invention and within the scope of the appended claims.

What is claimed is:

1. In combination with a lock including a cylinder and a key actuated barrel rotatable in said cylinder from a first position wherein a key may be slid inwardly and outwardly therein to a second position wherein sliding of the key is prevented; structure comprising a sleeve member connected at one end to said barrel and rotatable with the latter, plate means connected to the other end of said sleeve member containing an aperture therethrough, rod means slidable in said sleeve member and projectable at one end into said barrel, bridge carrying means supporting an electrically conducting bridge means connected to said rod means adjacently of the other end thereof, electrical contact means disposed adjacent to the other end of said rod means, said electrically conductive bridge means being movable between bridging and non-bridging positions with respect to said electrical contact means, coupling means integrally of said bridge carrying means projecting into and slidable within said aperture, said bridge carrying means being rotatable in response to rotation of said key actuated barrel due to rotation of the apertured plate and corresponding rotation of said coupling means and movable toward and away from said electrical contact means in response to movement of the key inwardly and outwardly of said barrel, respectively.

2. The structure set forth in claim 1 wherein said electrically conductive bridge means is resiliently mounted on said bridge carrying means.

3. The structure as set forth in claim 1 wherein said electrical contact means includes a pair of mutually insulated contact points, said pair of points being part of a circuit including an electrical energy source and signal means, said conductive bridge means being adapted to interconnect said points to thereby close said circuit.

4. The structure as set forth in claim 1 including bias means normally urging said bridge carrying means toward said barrel, said rod means sliding into said barrel when said key is slid out of said barrel.

5. The structure as set forth in claim 1 wherein said electrical contact means includes a pair of mutually insulated contact points, said pair of points being part of a circuit including an electrical energy source and signal means, said electrically conductive bridge means being adapted to bridge said points when said key is in the first position and disposed inwardly of said barrel.

6. The structure as set forth in claim 1 wherein said sleeve member is tubular and wherein said signal means emits an audible signal.

7. The structure as set forth in claim 1 including bridge carrying means connected to said rod means, said electrically conductive bridge means being resiliently mounted upon said bridge carrying means.

References Cited

UNITED STATES PATENTS

| | | | |
|---|---|---|---|
| 1,828,747 | 10/1931 | Perry | 200—42 |
| 2,289,296 | 7/1942 | Provan | 200—42 |
| 2,517,506 | 8/1950 | Riggs | 200—44 |
| 2,641,920 | 6/1953 | Gill et al. | 70—388 |
| 2,655,569 | 10/1953 | St. John | 70—388 X |
| 2,774,855 | 12/1956 | Simmons | 219—19 |
| 3,026,385 | 3/1962 | Davis et al. | 200—44 |

ROBERT K. SCHAEFER, *Primary Examiner.*

H. J. HOHAUSER, *Assistant Examiner.*